United States Patent
Fan et al.

(10) Patent No.: US 9,344,951 B2
(45) Date of Patent: May 17, 2016

(54) FORWARDING AND ROUTING IN SENSOR NETWORKS

(75) Inventors: Zhong Fan, Bristol (GB); Sedat Gormus, Bristol (GB)

(73) Assignee: Kabushiki Kaisha Toshiba, Tokyo (JP)

(*) Notice: Subject to any disclaimer, the term of this patent is extended or adjusted under 35 U.S.C. 154(b) by 156 days.

(21) Appl. No.: 13/278,840

(22) Filed: Oct. 21, 2011

(65) Prior Publication Data

US 2012/0099587 A1 Apr. 26, 2012

(30) Foreign Application Priority Data

Oct. 22, 2010 (GB) .................................. 1017919.0

(51) Int. Cl.
| | | |
|---|---|---|
| *H04W 40/16* | (2009.01) | |
| *H04L 12/725* | (2013.01) | |
| *H04L 12/753* | (2013.01) | |
| *H04W 40/22* | (2009.01) | |
| *H04W 84/18* | (2009.01) | |

(52) U.S. Cl.
CPC ............. *H04W 40/16* (2013.01); *H04L 45/302* (2013.01); *H04L 45/48* (2013.01); *H04W 40/22* (2013.01); *H04W 84/18* (2013.01)

(58) Field of Classification Search
CPC .............................. H04W 84/20; H04W 84/18
USPC .................... 370/254, 255, 256, 389
See application file for complete search history.

(56) References Cited

U.S. PATENT DOCUMENTS

| | | | |
|---|---|---|---|
| 6,633,544 B1 | 10/2003 | Rexford et al. | |
| 8,068,507 B2* | 11/2011 | Roy ............................. | 370/406 |
| 8,116,201 B2* | 2/2012 | Nandagopalan et al. ..... | 370/232 |
| 8,230,108 B2* | 7/2012 | Pratt et al. ..................... | 709/238 |
| 8,441,958 B2* | 5/2013 | Thubert et al. ................ | 370/254 |
| 2006/0291404 A1 | 12/2006 | Thubert et al. | |
| 2007/0091811 A1* | 4/2007 | Thubert et al. ............... | 370/238 |
| 2011/0228788 A1* | 9/2011 | Thubert et al. ............... | 370/400 |
| 2013/0022046 A1* | 1/2013 | Vasseur et al. ............... | 370/392 |
| 2013/0051250 A1* | 2/2013 | Shaffer et al. ................ | 370/252 |

FOREIGN PATENT DOCUMENTS

| | | |
|---|---|---|
| JP | 2010-45720 | 2/2010 |
| JP | 2010-63068 | 3/2010 |
| WO | WO 2010/084775 A1 | 7/2010 |

OTHER PUBLICATIONS

Japanese Office Action issued Jan. 8, 2013, in Patent Application No. 2011-231270 (with English-language translation).
United Kingdom Search Report issued Feb. 18, 2011, in Patent Application No. GB1017919.0.
Shouhong Zhu, et al., "Distributed Cooperative Routing for UWB Ad-Hoc Networks", International Conference on Communications, 2007, pp. 3339-3344.

* cited by examiner

*Primary Examiner* — Robert M Morlan
(74) *Attorney, Agent, or Firm* — Oblon, McClelland, Maier & Neustadt, L.L.P.

(57) ABSTRACT

Opportunistic forwarding of packet based communication is implemented by way of attention to link quality to determine a suitable prioritised route for communication. Ranking of potential routes (or the next hop in a route) can be conducted locally, with reference to a link quality metric also. Channel access by nodes of the same rank in a graph based network can be by way of link quality also.

12 Claims, 10 Drawing Sheets

FORWARDING AND ROUTING IN SENSOR NETWORKS

FIELD

Embodiments described herein relate to forwarding and routing in sensor networks.

BACKGROUND

One component envisaged for future smart grid systems is Advanced Metering Infrastructure (AMI), which is expected to provide two-way communications that allow utilities to not only keep track of consumers' electricity usage, but also keep consumers informed of latest electricity prices and perform remote utility management, all on a real-time basis.

DETAILED DESCRIPTION

"RPL based routing for advanced metering infrastructure in smart grid" (D. Wang et al., IEEE ICC, 2010) describes one possible way of enabling the envisaged functionalities in AMI. This paper suggests deployment of a multi-hop wireless mesh network that connects a very large number (hundreds or even thousands) of electric meters to a gateway, which in turn is connected to a control centre that coordinates all kinds of management mentioned above.

A multi-hop networking solution for smart metering has also been proposed in IEEE 802.15.4 g, as noted in "PHY and MAC Proposals for low-power consumption SUN" (Fumihide Kojima and Hiroshi Harada, 802.15.4 g proposal). The text of this proposal can presently be found at the following link.
https://mentor.ieee.orq/802.15/dcn/09/15-09-0312-00-004g-phy-and-mac-proposals-for-low-power-consumption-sun.pdf.

In such a wireless mesh based AMI network, generally there are two types of traffic: inward unicast traffic flowing from each meter to the gateway (for example meter reading data), and outward unicast traffic flowing from the gateway to each meter (for example utility management data).

Although meter nodes in an AMI network are stationary, the quality of wireless links between an arbitrary pair of nodes is, in general, unstable and varies with time due to fading effects and signal interference. For example, the link quality in a real 802.15.4 network varies considerably over time. Therefore, in order to satisfy the high-reliability and low-latency requirements of AMI, AMI networking protocols have to take into account varying link qualities and be adaptive, and at the same time must only produce moderate amount of protocol overhead.

RPL, described in "RPL: IPv6 Routing Protocol for Low Power and Lossy Networks" (T. Winter et al., http://tools.ietf.org/html/draft-ietf-roll-rpl-07), is a routing protocol for low power and Lossy networks (LLN) developed by the Internet Engineering Task Force (IETF) Routing Over Low power and Lossy networks (ROLL) working group. RPL belongs to the class of gradient routing protocols, as discussed in "Implementation of gradient routing in wireless sensor networks" (T. Watteyne et al., IEEE Globecom, 2009), in which each node is assigned a scalar value which, for ease of discussion, is known as "height". Heights are assigned in such a way that they increase with distance from a central node. Distance is calculated using a cumulative cost function which can be based on hop count, energy consumption, residual node energy, or any combination thereof. The forwarding process selects the next hop as the neighbour which offers the largest gradient, namely the neighbour with lowest height.

Figure 3:
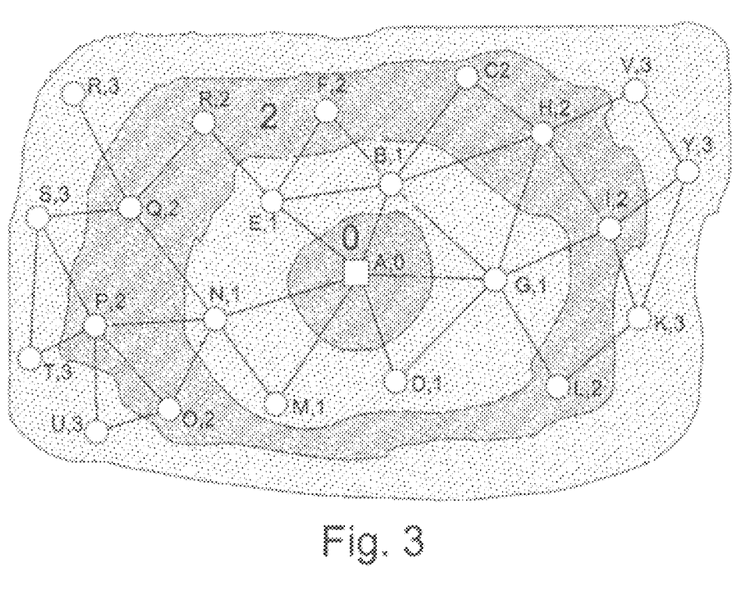
FIG. 3 illustrates a representation of a network topology on the basis of hop count from a particular node of the network.

In wireless sensor networks (WSN), very often all traffic is sent to a single sink node. In this case, a single gradient—rooted at the sink node—is built and maintained in the network. FIG. 3 depicts a topology, put forward in the Watteyne paper, where nodes are assigned heights calculated as a function of hop count. When node Y at height 3 sends a message, it sends it to its neighbour of smallest height node I; similarly node I relays the message to G, and G to A.

In RPL, directed acyclic graphs (DAGs) are used to maintain network state information. A DAG is a directed graph with no directed cycles. That is, it is formed by a collection of vertices and directed edges, each edge connecting one vertex to another, such that there is no way to start at some vertex v and follow a sequence of edges that eventually loops back to v again. For each DAG created in RPL, there is a root. The DAG root typically is the gateway node in AMI networks or the sink node in sensor networks. All edges in the DAG are contained in paths oriented toward, and terminating at, one root node. Each node in the DAG is associated with a rank value ("height" in gradient routing). The rank of nodes along any path to the DAG root should decrease monotonically in order to avoid any routing loop.

A concise description of RPL operation is given in Wang et al, while protocol details can be found in Winter et al. In order to construct a DAG, the gateway node will issue a control message called DAG Information Object (DIO). A DIO message conveys information about the DAG and includes:

a DAGID used to identify the DAG as sourced from the DAG root;

rank information used by nodes to determine their positions in the DAG relative to each other; and objective function, identified by an Objective Code Point (OCP), which specifies the metrics used within the DAG and the method for computing DAG rank.

Any other node (namely a client node) that receives a DIO message, has not already joined the DAG, and is willing to do so, should add the DIO sender (the previous node through which the DIO has passed) to its parent list, compute its own rank (associated with the parent node) according to the OCP, and pass on the DIO message with the updated rank information.

For a node which has already joined the DAG, upon receiving another DIO message it may have the option to:
1. discard the DIO based on several criteria recommended by RPL,
2. process the DIO to maintain a position in an existing DAG, or
3. improve its position (by obtaining a lower rank) according to the OCP and current path cost.

After the DAG is constructed, each client node will be able to forward any inward traffic (destined to the gateway) to its parent as the next-hop node.

In order to support the outward traffic from the gateway to a client node (for example for controlling purposes), the client node should issue a control message called Destination Advertisement Object (DAO). The information conveyed in the DAO message includes:
- the rank information used by nodes to determine how far away the destination (the client node that issues the DAO message) is; and
- reverse route information to record the node visited along the outward path.

In passing this DAO message from the client node to the gateway according to the inward path indicated by the DAG, all of the intermediate nodes record the reverse path information from the DAO message, and so a complete outward path is established from the gateway to the client node.

To summarise the operation of RPL, for inward unicast traffic, a meter node that generates or receives an inward data packet destined for the gateway, should forward this packet to its default parent. The default parent of a node is in the parent list of the node and has a lowest rank among all the nodes in the parent list. For outward unicast traffic, a node that generates or receives an outward data packet destined for a meter node should search for an entry containing the destination node in the destination list, and forward the packet to the next-hop node indicated by that entry.

Figure 1:
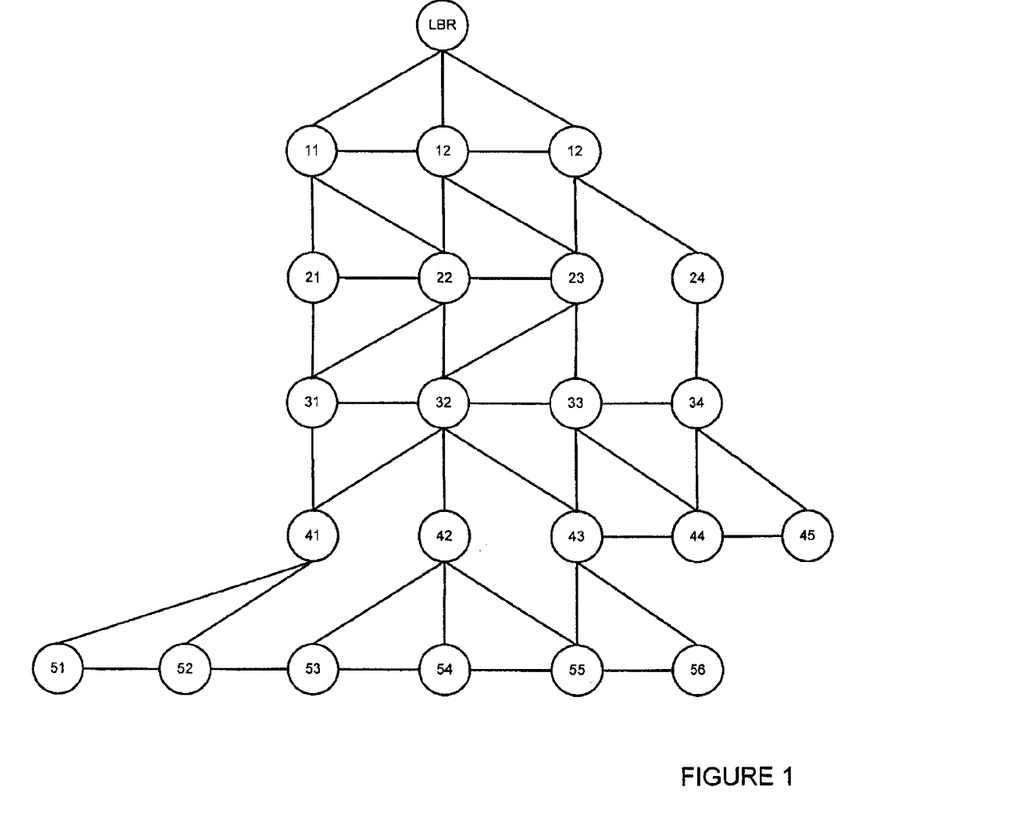
FIG. 1 illustrates an example physical topology of a network, the example being used in describing prior art and embodiments herein.

FIG. 1 sets out an example LLN physical topology suggested by Winter et al. The illustrated arrangement comprises a plurality of nodes connected together by links. In this example, the links depicted are all usable L2 links. It is assumed that all links are equally usable, and that the implementation specific policy function is simply to minimize hops. A head node comprises a gateway node, also known in the art as an LBR (Low power and lossy network Border Router). The remaining nodes are smart meters, which are electricity supply meters with computing and wireless communications capabilities.

Figure 2:
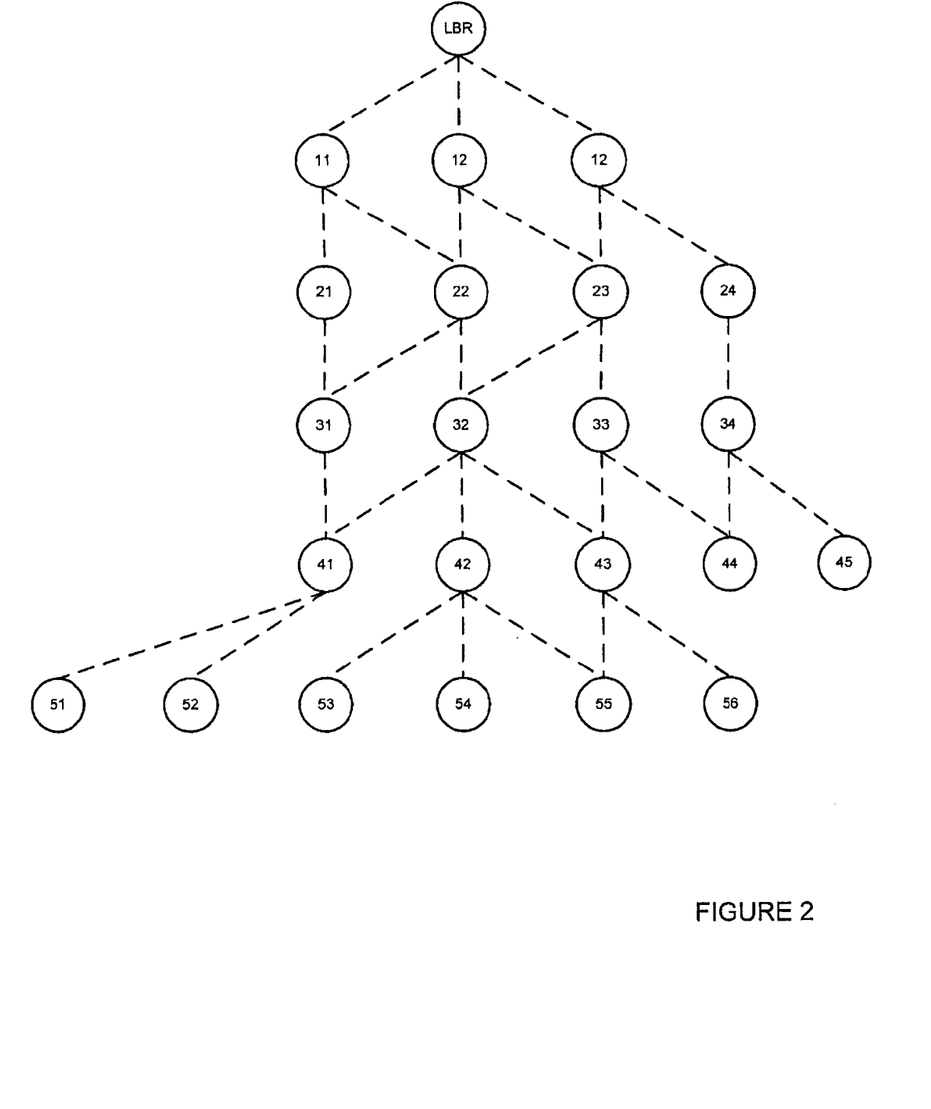
FIG. 2 illustrates a directed acyclic graph (DAG) derived from the network illustrated in FIG. 1.

This LLN physical topology then yields the DAG depicted in FIG. 2, where the links depicted are the edges toward DAG parents. Edges not exhibiting a gradient are excluded. This topology includes one DAG, rooted by the LBR node at rank 1. Nodes (11), (12), (13) specify (LBR) as their only parent, attached to the DAG at rank 2; these nodes periodically multicast DIOs. Node (22) has selected (11) and (12) in its DAG parent set, and advertises itself at rank 3. Node (22) thus has a set of DAG parents {(11), (12)} and siblings {((21), (23)}. The reader will note that links depicted represent directed links in the DAG overlaid on top of the physical topology depicted in FIG. 1. As such, the depicted edges represent the relationship between nodes and their DAG parents, wherein all depicted edges are directed and oriented toward the DAG root (LBR) (that is, as illustrated, towards the top of the page). The DAG may provide default routes within the LLN, and serves as the foundation on which RPL builds further routing structure, for example through the destination advertisement mechanism.

Much work has been done in the field on sensor network routing and optimization. However, much of this work is concerned with generic sensor network applications; at least one implementation of the embodiments described herein may offer an enhancement to the RPL protocol applied in smart metering networks.

According to one embodiment, there is provided a method of routing a message from a source node to a destination node, the nodes being in a network arranged as a directed acyclic graph, DAG, in which said destination node has higher rank than said source node, the method comprising forwarding said message through one or more intermediate nodes in said network between said source node and said destination node, wherein said forwarding comprises opportunistically forwarding said message with reference to a decision metric.

The forwarding can comprise selecting, from nodes available to said forwarding node, one of said nodes on the basis of a channel access timer, said channel access tinier being dependent on a link quality metric.

The link quality metric can comprise a measure of signal to interference plus noise, SINR, in the communication channel between the forwarding node and a node intended to be in receipt of said forwarded message.

The forwarding can comprise co-ranked nodes in said DAG concurrently attempting to forward said message on the basis of channel access governed by channel access timers, respective channel access timers for said co-ranked nodes being dependent on a link quality metric for forwarding of messages through said network from the node in question.

The above method can comprise monitoring, by a node in a group of co-ranked nodes, for successful forwarding of a message by another co-ranked node and, on detection of such forwarding, discarding said message.

According to a second embodiment, there is provided a method of establishing routing of messages from a source node to a destination node, the nodes being in a network arranged as a directed acyclic graph, DAG, comprising storing information, at a node, comprising possible routes in said DAG from said node to a destination node, and information sufficient that, for each route, a route performance metric can be determined for that route, such that said routes can be ranked in terms of said route performance metric, and such that on occasion that a source node requires a message to be forwarded to a destination node, a route can be selected in order of preference.

The method of the second embodiment can include storing link quality information for links defined between nodes in said network.

The method can comprise storing, at a node, information describing a plurality of routes from that node.

The method can comprise storing, alongside said information describing a route, information describing a route performance metric for said described route.

The route performance metric can comprise an expected transmission count for said route.

According to a third embodiment, there is provided a method of forwarding a message from a node prepared by performance of the method of the second embodiment, comprising selecting a route from said node on the basis of said stored information and on the basis of said order of preference, forwarding said message with said selected route for further nodes in said network to follow, and monitoring outcome of said forwarding, such that, in the event that said forwarding is unsuccessful, a further route can be selected on the basis of said order of preference.

The method can comprise storing information describing outcome of forwarding, and updating stored information describing a route performance metric accordingly.

According to a fourth embodiment, communications apparatus, for implementing a node in a network in the form of a directed acyclic graph, DAG, comprises message forwarding means operable to forward a message opportunistically with reference to a decision metric.

The message forwarding means can comprise channel access timing means operable to define a channel access timer on the basis of a link quality metric, wherein said message forwarding means is operable to attempt to forward a message on expiry of said channel access timer.

The apparatus can comprise link selection means operable to select, from available nodes to which a message can be forwarded, a particular node, on the basis of a link quality metric.

The link quality metric can comprise a measure of signal to interference plus noise, SINR, in a communication channel defined between the apparatus and a node intended to be in receipt of said forwarded message, in use.

According to a fifth embodiment, a network of communication apparatus in accordance with the fourth embodiment, each apparatus forming a node in the network, the network being in the form of a directed acyclic graph, DAG, comprises a plurality of ranks, at least one of said ranks comprising more than one node, wherein said message forwarding means in said apparatus in a rank comprising more than one node are each operable to concurrently attempt to forward a message on the basis of channel access governed by channel access timers, respective channel access timers for said co-ranked nodes being dependent on a link quality metric for forwarding of messages through said network from the node in question.

In each of said apparatus in a rank comprising more than one node, monitoring means can be provided, operable to monitor for successful forwarding of a message by another co-ranked node and, on detection of such forwarding, discarding said message in that apparatus.

According to a sixth embodiment, communications apparatus is provided for implementing a node in a network in the form of a directed acyclic graph, DAG, the apparatus comprising information storing means, operable to store information, at a node, comprising possible routes in said DAG from said node to a destination node, and information sufficient that, for each route, a route performance metric can be determined for that route, such that said routes can be ranked in terms of said route performance metric, and such that on occasion that a source node requires a message to be forwarded to a destination node, a route can be selected in order of preference.

Link quality information storing means can be provided, operable to store information describing link quality for links defined between nodes in a network in which said apparatus is incorporated in use.

Route information storing means can be provided, operable to store information describing a plurality of routes from said apparatus in a network in which said apparatus is incorporated in use.

Aspects as set out above, or embodiments such as described below or envisaged by the reader in the light of the present disclosure, can be in the form of a hardware implementation, a software implementation, or a mixture of both. A computer program product could be involved in the implementation of an embodiment, either as a complete set of computer executable instructions capable of configuring, on its own, the performance of one or more of the embodiments, or as a set of instructions engaging pre-existing operable software components on a computer, to cause the configuration of the computer in the desired manner.

Whatever form the computer program product takes, it can be embodied in a computer readable storage medium, such as a magnetic or optical storage medium or a programmable electronics storage medium such as a solid state device, or as a computer readable signal, such as on a wireless communications channel, by which the computer program product can be introduced into a computer. The computer program product may be directly executable, or may require local processing, such as decoding, decompression, or compilation, before it is in an executable condition. All possible ways of achieving configuration of a general purpose device as an implementation of an envisaged embodiment should be considered by the reader.

Figure 4:
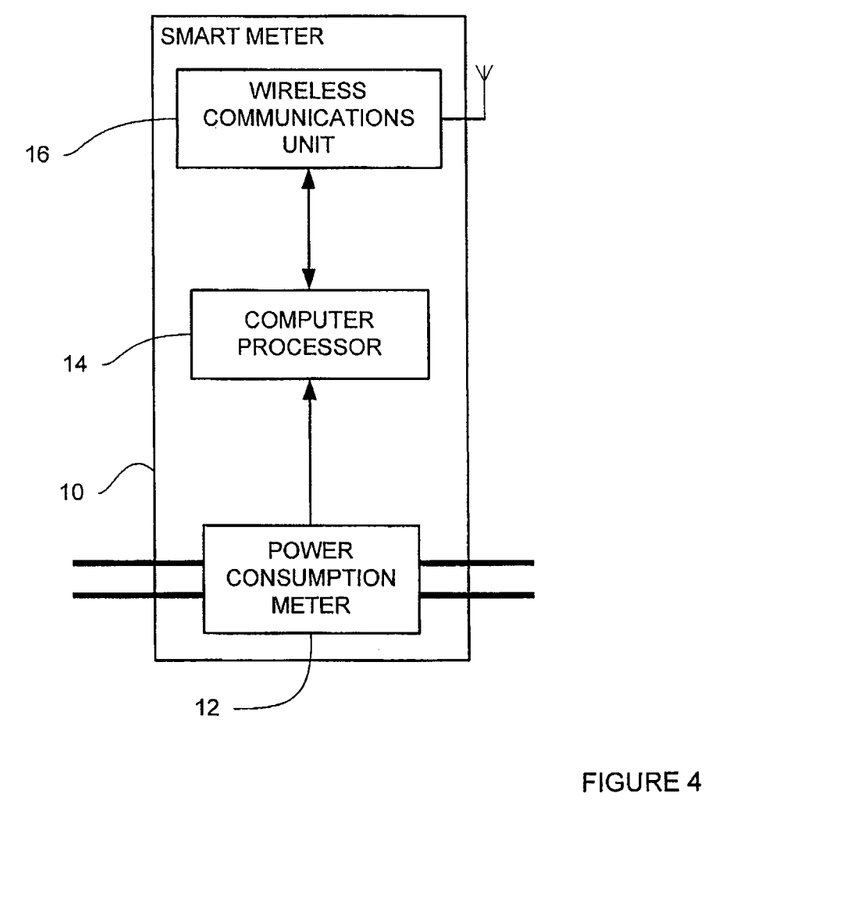
FIG. 4 illustrates a smart meter of an embodiment as described herein.

The embodiment described hereafter uses the example described above, with reference to FIG. 1, for consistency. Each node comprises a smart meter 10 as illustrated in FIG. 4. The smart meter 10 comprises a power consumption meter 12 of conventional construction. Such meters generally measure instantaneous voltage and current at the point of measurement, to determine a measure of instantaneous power consumption. Over time, a measure of power consumption per period of time can be built up.

The power consumption meter 12 passes a power consumption signal to a computer processing unit 14, which processes the power consumption signal in a desired manner. Part of this processing is focused on monitoring energy consumption for billing purposes, but partly, also, the smart meter is tasked with identifying activity which could be modified by the user to reduce or manage power consumption, such as by identifying connected equipment with high "stand by" usage, or usage which could be carried out at periods of low demand (such as recharge of night storage heaters, or use of large domestic appliances such as washing machines, dishwashers etc.). Such information as can be determined by the computer processing unit 14 in this way can be conveyed to the user by a suitable display, as will be described in due course. It is also envisaged that the smart meter 12 could have a capability to convey messages to control devices connected to the power supply, either by in-line communications and control devices, which might be embedded in a power supply plug or might be in the form of a device in-line between a power supply plug and corresponding socket. This capability might be wireless, or modulated onto the power supply itself (power line communication). The present disclosure is not directly concerned with such arrangements, but the above description is provided as context.

The smart meter 10 also comprises a wireless communications unit 16, which is engaged in the communication of information back to a gateway, as will be described in due course. It is also capable of receiving information from such a gateway, such as concerning pricing information (for instance to enable display to a user of energy consumption in a billing period) or the like, or to receive software updates and so on.

Figure 5:
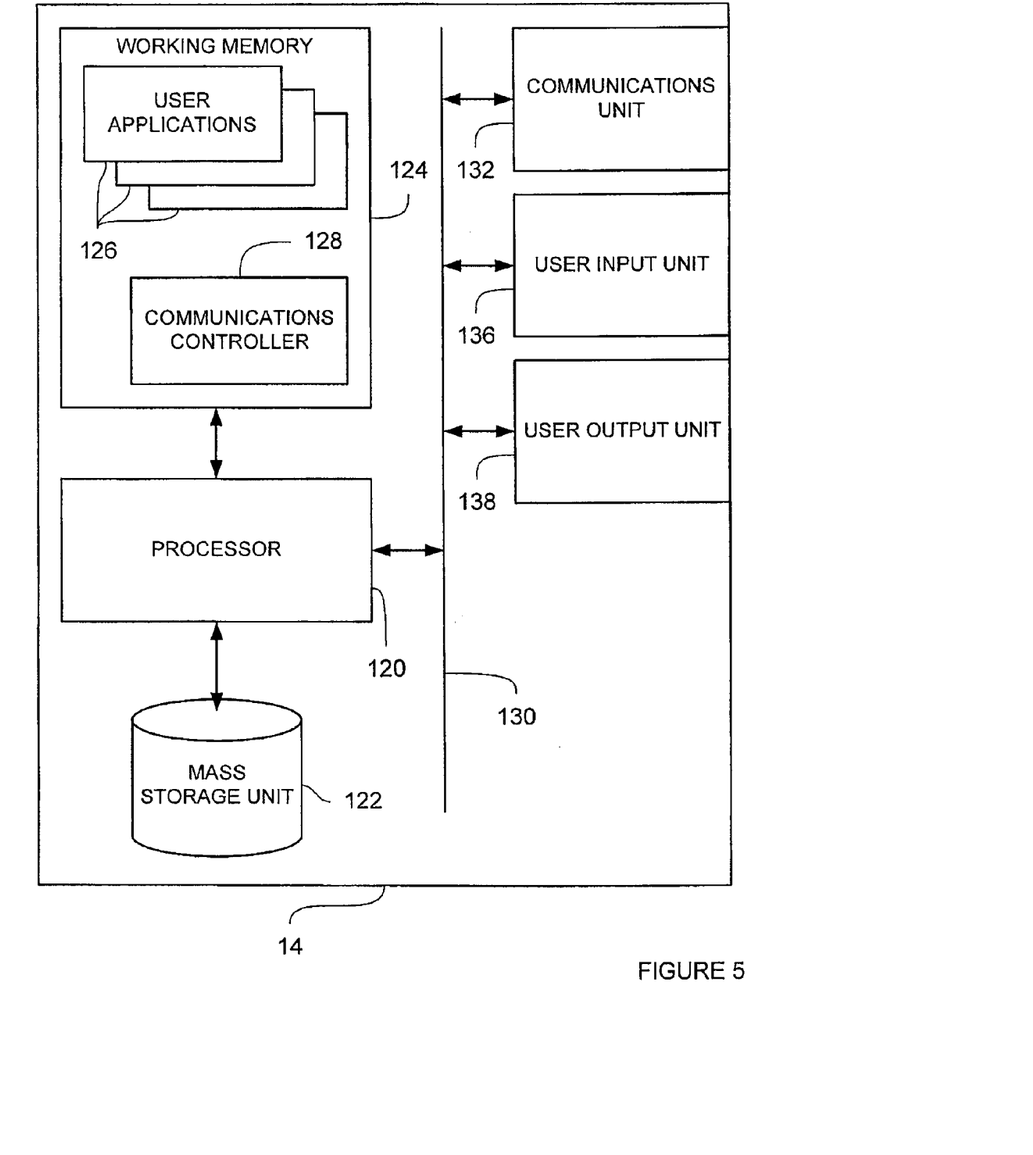
FIG. 5 illustrates a computer processor unit of the smart meter illustrated in FIG. 4.

The computer processing unit 14 is illustrated in further detail in FIG. 5. The computer processing unit 14 comprises a processor 120 operable to execute computer executable instructions, such as in the form of a computer program. The processor 120 is connected to a working memory 124, which may include components of Read Only Memory (ROM) and Random Access Memory (RAM) in order to achieve operability, by way of a bus 130. Also connected to the processor 120, either by way of the bus 130 or directly, is a mass storage unit 132, which encompasses one or more secondary storage devices such as a magnetic data recording device such as a disk drive, a solid state memory device such as a FLASH memory, or any other suitable device. It is anticipated that, normally, no device would be removable from a smart meter, but the facility might exist for a memory card or the like to be connected thereto to introduce data or program information, or to extract data therefrom.

A communications unit 132 is provided, to establish input/output facilities with other parts of the smart meter 10. A user input unit 136 is provided, which is expected to take the form of one or more push buttons, but which need not be limited thereto. A user output unit 138 provides a display output to a user, such as by an LCD or LED display.

As illustrated, numerous working application programs 126 are instanced in the working memory 124, along with a communications controller program 128. The intention is to illustrate the execution of computer programs by the processor 120 with reference to instructions stored in working memory. The reader will appreciate that this in no way limits the disclosure to such an arrangement, which will also include the possibility that only one program is instanced in memory at a time, or that one or more program portions (for instance libraries of program functions) are instanced for ease of use and to avoid the need for an entire computer program to be stored in working memory for the computer processing unit 14 to operate effectively.

The manner in which the smart meter 10 operates, alongside other smart meters 10 in a network arrangement as illustrated in FIG. 1, will now be described.

In this description, there is an understanding that the existing PHY and MAC protocols laid down in a standard, such as 802.15, are employed. The routing and forwarding protocol described hereafter is intended to operate on top of such protocols and is not dependent on any particular features of such PHY and MAC protocols. Needless to say, a packet structure is assumed.

Traffic Classification/Prioritization

Figure 6:
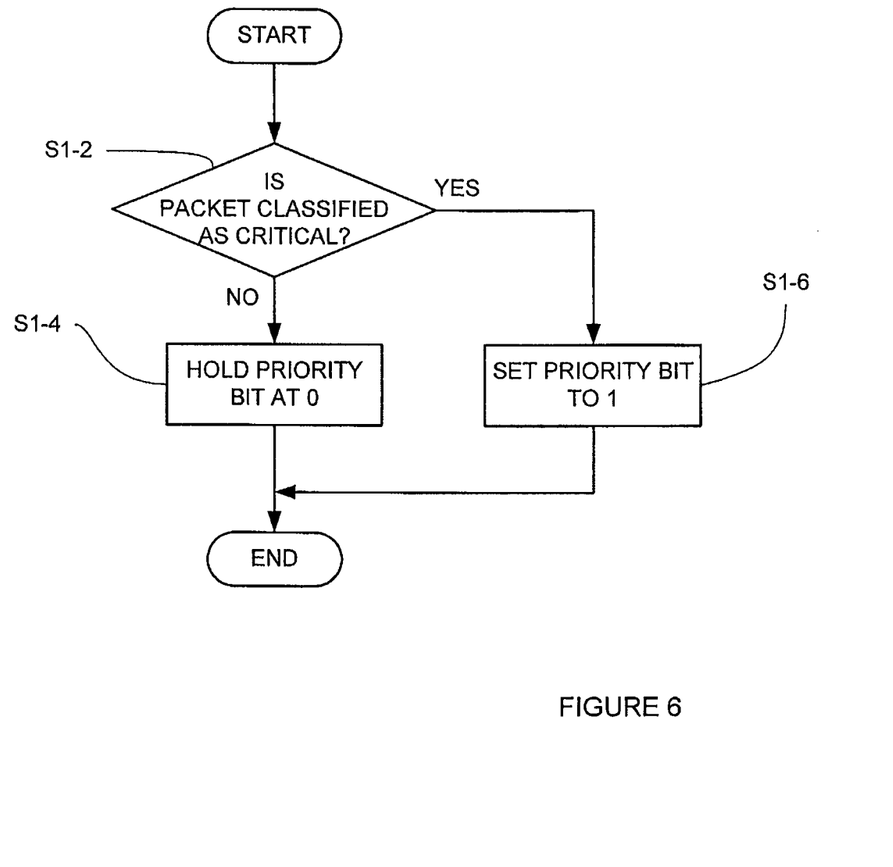
FIG. 6 illustrates a process of managing priority of a packet in accordance with an embodiment described herein.

For normal network operation (such as the taking of a routine meter reading), the traffic follows the default path as mentioned previously. FIG. 6 illustrates a method which is carried out at a transmitting node to prepare for transmission of a packet. A determination is made, in step S1-2, as to whether a packet is of standard priority, or has an emergency or critical nature. In step S1-4, if the packet is routine traffic, then a priority bit in the header of the packet is held at zero. This signals to a node handling the packet that it is to be treated as a regular packet for communication by a default communication path.

In step S1-6, carried out if the packet is classified as critical, the priority bit is set to level 1. Packets with the priority bit set to 1 will be treated as high priority and delivered to the destination with high reliability and low latency.

Figure 7:
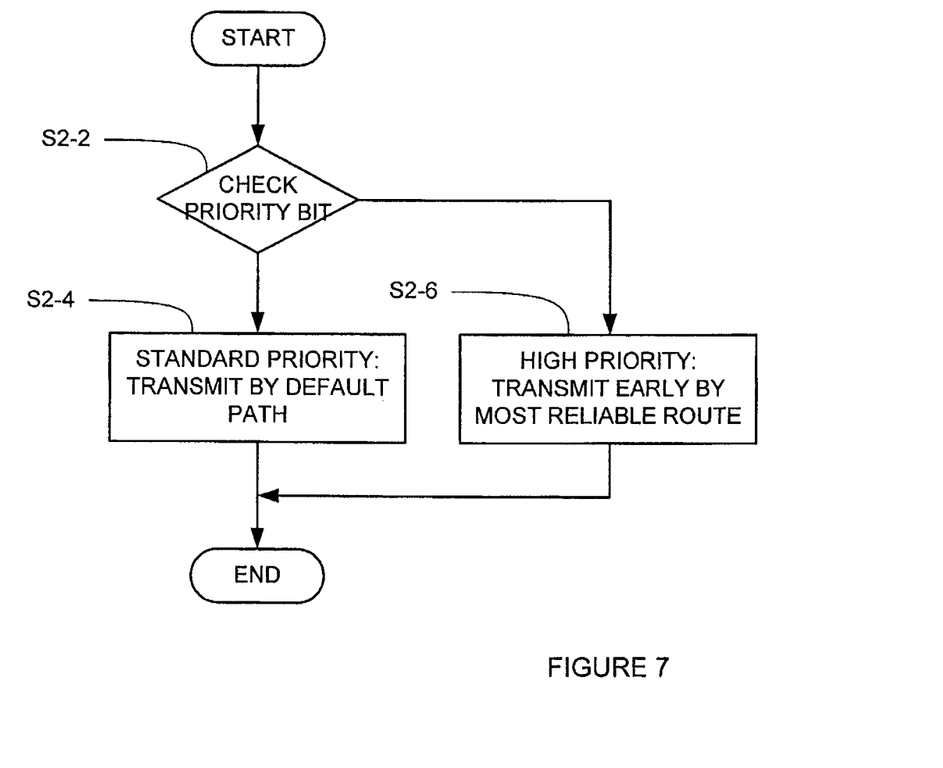
FIG. 7 illustrates a process of responding to priority of a packet in accordance with an embodiment described herein.

As shown in FIG. 7, a node processing a packet, either for initial emission thereof or in a routing situation, will process the packet on the basis of the priority bit contained in the header of the packet. In step S2-2, the priority bit is checked.

If the priority bit is set to 0, then in step S2-4, the packet is transmitted by a default path. If the priority bit is set to 1, then the packet is prioritised for transmission as soon as possible (for low latency) by an identified most reliable route. The most reliable route is identifiable by the node on the basis of previous successful transmissions, success being determined on the receipt of an acknowledgement from a packet recipient node.

Multipath Routing

"A high-throughput path metric for multi-hop wireless routing" (D. De Couto et al., ACM Mobicom, 2003) describes a concept known as expected transmission count (ETX) as a routing metric. This is a link quality/reliability metric under discussion for adoption into RPL. ETX describes the number of transmissions a node expects to make to a destination in order to successfully deliver a packet. For example, an implementation may use the following formula: $ETX=1/(Df*Dr)$ where $Df$ is the measured probability that a packet is received by the neighbour and $Dr$ is the measured probability that the acknowledgment packet is successfully received. So ETX can be seen as the reciprocal of packet delivery ratio (cf. FIG. 1). There are various ways of measuring ETX. As noted in the De Couto et al. paper, one way of determining ETX is for each node to broadcast link probe packets of a fixed size, at an average period (for instance an average period of 1 second). Every node then stores information recording the probe packets that it received in a particular period (of a plurality of the average inter-probe period), allowing the node in question to calculate the delivery ratio from the sender. ETX for a path is, by this method, the sum of link metrics for the nodes in that path.

Multipath routing is intended to maintain multiple paths to increase reliability. In RPL, with ETX information embedded in DIO messages, each node could have multiple parents with different ETX values. For other routing protocols, such as Ad hoc On-Demand Distance Vector (AODV) routing, described in "Ad hoc On-Demand Distance Vector (AODV) Routing" (C. Perkins et al., RFC 3561, 2003), this could be achieved by incorporating and updating ETX in the Route Reply packets. When the Route Reply is received by the source, the new route is added to the routing table, even if there is already a route to the same destination. In that way, multiple routes, if available, are maintained. The source stores the next hop and the value of ETX.

Hence, for the same destination, multiple paths may be established (subject to availability), ranked with different ETX values. Any critical message will be transmitted first along the path with the best ETX metric (rather than the path with minimum hops). If a critical message is lost and needs to be retransmitted (such as due to network congestion or node failure), it will be sent on the second best route, which will be different from the former route. This way, redundancy has been built in to cope with link fluctuations and network failure, and to ensure reliable delivery of critical or emergency traffic.

Figure 8:
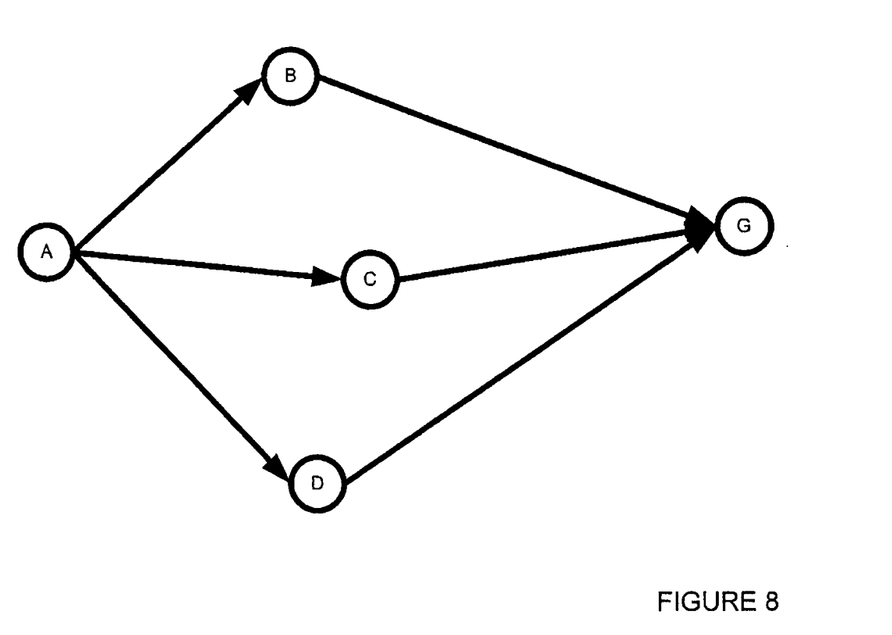
FIG. 8 illustrates by way of example a choice of routes from a first node to a second node in a network in accordance with an embodiment described herein.

As shown in FIG. 8, a source node A has three possible paths to a sink G (or three parents as the situation would be expressed in RPL), via nodes B, C and D respectively. The paths are ranked in the ETX metric at each node, with the best being (for argument's sake) A-B-G followed by A-C-G and A-D-G. Then if a critical message fails to reach G (for example if no ACK received) via A-B-G, the source will try A-C-G and so on. In this way path diversity can be achieved.

In a real case, different paths may not be completely disjoint, and some of the paths may share intermediate links. However, the DAG structure as described above should guarantee loop free communication.

Thus, each node maintains information concerning the possible next hop that can be taken by a forwarded message, i.e. a list of its parents in the DAG, with ETX values, in order of ETX value. If a message becomes lost due to link failure, it can be re-sent along an alternative route immediately.

Opportunistic Packet Forwarding

In this method, the source at each DAG rank forwards the received packet to its parents using a selected link quality metric (such as SINR). This metric is used to assign different channel access priorities to the nodes at the same DAG rank. In this case, all of the receiving parent nodes perform a method largely in line with the flow diagram in FIG. 9. In a first step, S3-2, a channel access timer is initiated, with initial values dictated by the selected link quality metric. The channel access timer imposes a stand-off period during which the node makes no attempt to access the channel. During the stand-off period, the node is listening for access activity by another node in the same rank (step S3-6). If this occurs, then the node discards the message (step S3-8), as having been forwarded by another node, before the node in question has had an opportunity to gain access to the channel.

Figure 9:
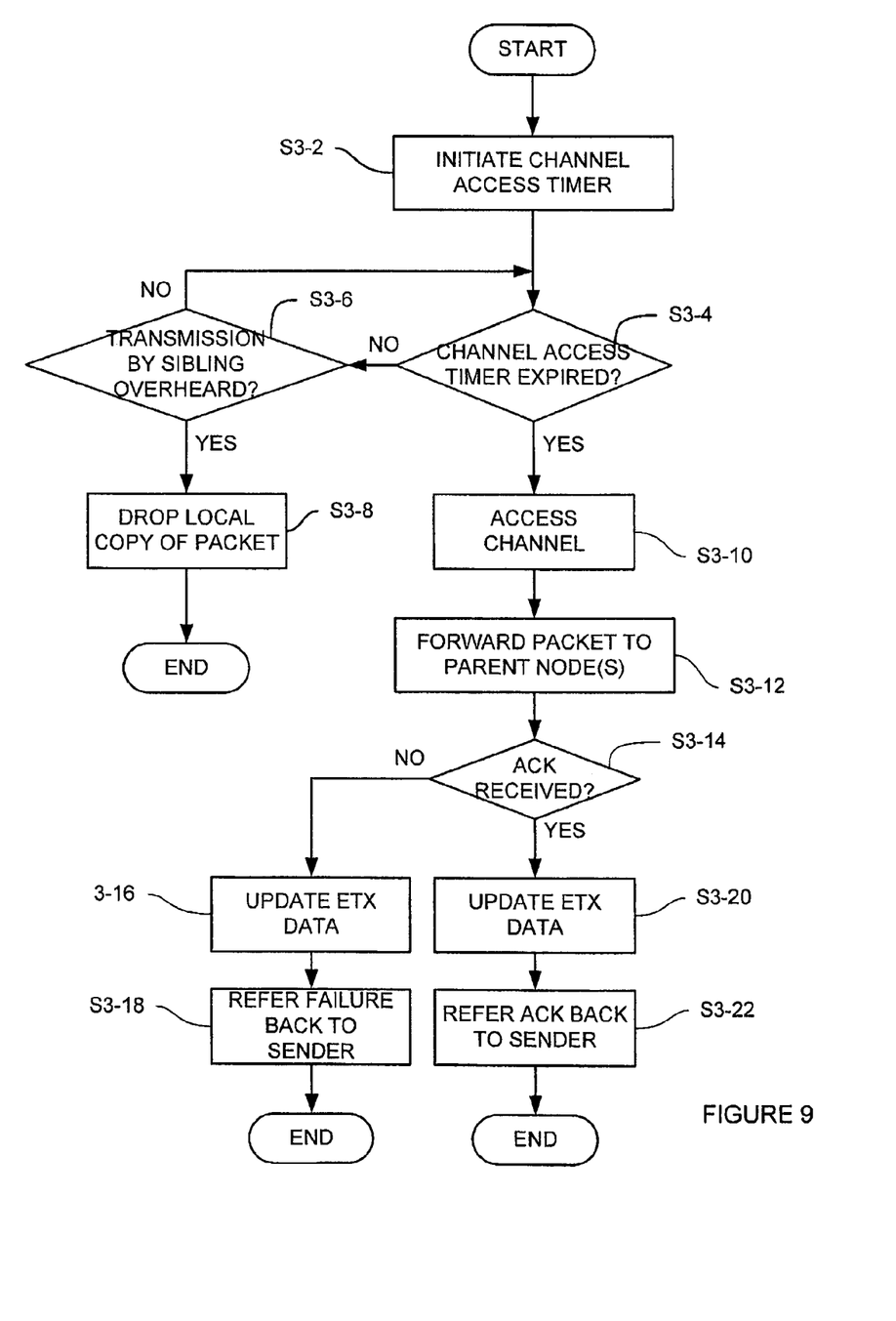
FIG. 9 illustrates a process of managing the forwarding of a packet, or otherwise, in accordance with an embodiment described herein.

On expiry of the channel access timer (step S3-4) without another sibling node having pre-empted it, the node gains access to the wireless channel (step S3-10). On gaining access, the node forwards the received packet to its parent nodes (S3-10). The node then listens for an acknowledgement of receipt, for a predetermined time (step S3-14). If no acknowledgement is received, then this is classed as a failure, which is reported back to nodes of junior rank (step S3-18). This will be noted in updated ETX calculations (step S3-16). In any event, a received ACK is returned to the node originating the packet (step S3-22) and can be used to update link quality information on the basis of which future ranking of nodes can be made (step S3-20).

As other nodes at the same DAG rank are carrying out the same process, it is useful to consider what they do when the node in question gains access. Simultaneously, the other nodes at the same DAG rank, which overhear a successful frame handover, drop the local copy of the forwarded packet (step S3-8). The same process is repeated until the sink node is reached. This method provides diversity over number of parent links at each DAG rank and creates a more reliable communication link by selectively forwarding the received frame based on the selected link quality metric.

Figure 10:
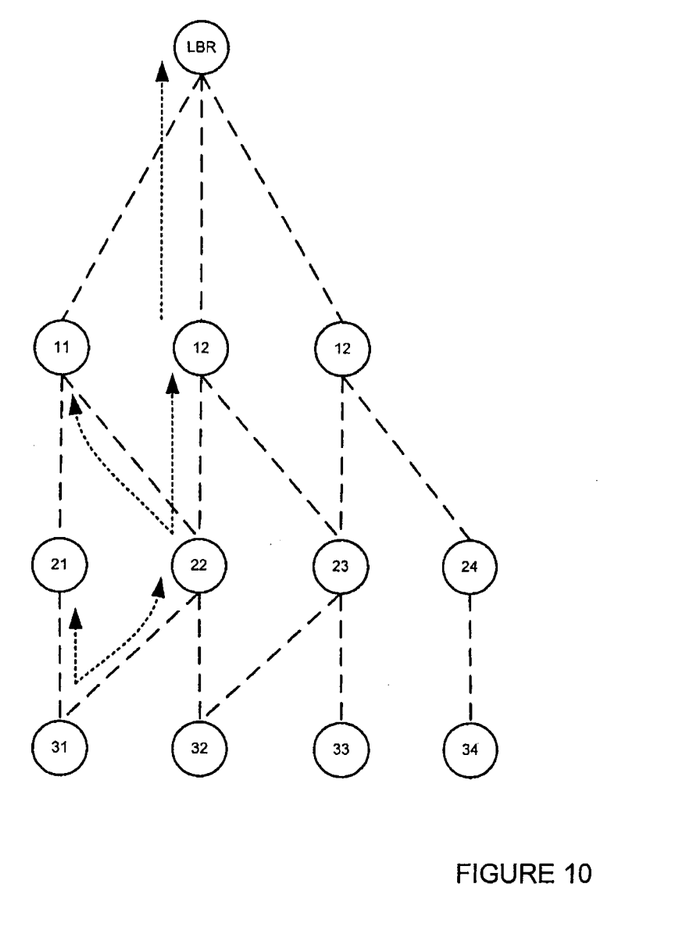
FIG. 10 illustrates routing of a packet through the DAG illustrated in FIG. 2.

FIG. 10 shows an example of use of a portion of the DAG illustrated in FIG. 2, from rank 3 upwards, employing the method illustrated in FIG. 9. In this scenario, node (31) is shown forwarding a critical information packet to the sink node (LBR). That is, the priority bit is set to '1'. For this example, the selected link quality metric is SINR (Signal to Interference-plus-Noise Ratio) (say, Zigbee-based sensor). Node (31) has two parents and it forwards the packet to both of these parents. Here, for opportunistic forwarding, only the node with the best SINR to the sink will forward the frame. The parent nodes ((21), (22)) receive the frame and initiate back off timers using the best SINR to their parent nodes—the larger the SINR, the smaller the back off time. In the example, node (22) has a greater SINR value to its parents and gains access to wireless channel for transmitting its data. Once node (22) forwards the packet to its parents, node (21) discards the local copy of the same data. When nodes (11) and (12) receive the packet from the lower rank node, the same opportunistic forwarding takes place and node (12) forwards the incoming packet to the sink node (LBR).

This described embodiment can, in particular implementation thereof, provide an efficient way for forwarding a critical data packet from source node to sink node by using selective forwarding. A side effect of it is that it may consume slightly more energy at the sensor nodes than regular forwarding on a default path, since the sensor nodes at each DAG rank level will have to extend their listening period (before going back to sleep) during the cooperative forwarding process to make sure that the frame is successfully forwarded to the intended destination(s). Fortunately, this mode of operation is required only for critical traffic—routine traffic can follow its default route in the DAG.

A simple analysis of the benefit of opportunistic forwarding will now be set out. For instance, in FIG. 8, node A has three possible next hops to the sink: B, C, and D.

Assuming that the transmission success probability for each link is p, then by pre-selecting only one of the links, the probability that the chosen node will not receive the packet (also expressed as the retransmission probability) is 1-p. For opportunistic forwarding, however, the probability that at least one of the prospective relays receives the packet is $1-(1-p)^3$, and the retransmission probability of the packet is now only $(1-p)^3$.

Although the framework for RPL has been established by the relevant working group, the specific technical details of RPL remain under development. As it currently stands, RPS has many desirable features for machine to machine (M2M) communication, and yet it remains to be seen how RPL should be implemented and enhanced in order to meet the stringent requirements of smart metering or AMI.

One intention in providing the above disclosure of certain embodiments is to lead the reader towards implementations which may address this issue by providing mechanisms to enhance reliability and QoS of delivering certain critical or emergency application data in the AMI network. The protocol enhancement implicit in the above disclosure is compatible with RPL and incurs minimal overhead (for instance SINR information is readily available from Zigbee hardware).

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and sprit of the inventions.

The invention claimed is:

1. A method of routing a message from a source node to a destination node, in a network having a plurality of nodes arranged as a directed acyclic graph, DAG, said plurality of nodes further arranged in a plurality of ranks in which said destination node has lower rank than said source node, the method comprising:
   forwarding said message through a plurality of intermediate nodes in said network between said source node and said destination node, the forwarding including
      forwarding said message from a forwarding node to a further plurality of intermediate nodes having a next lower rank, and, at each node holding said message,
      setting a channel access timer to impose a stand-off period during which said node does not attempt channel access and listens to other nodes in the same rank as said node for successful forwarding of said message to parent nodes of said node by another node in the same rank as said node,
   wherein
   if said listening results in detection of the successful forwarding by said another node in the same rank then the listening node discards said message, or
   if at expiration of said stand-off period no successful forwarding has been detected, then said message is forwarded to parent nodes of said node, wherein each node in the network is assigned a channel access timer dependent on a link quality metric.

2. The method in accordance with claim 1, wherein said forwarding further includes selecting, from nodes available to said forwarding node, one of said nodes on the basis of a link quality metric.

3. The method in accordance with claim 2, wherein said link quality metric includes a measure of signal to interference plus noise, SINR, in the communication channel between the forwarding node and a node intended to be in receipt of said forwarded message.

4. A communications apparatus for implementing a node in a network in the form of a directed acyclic graph, DAG, the network having a plurality of nodes arranged in a plurality of ranks in which said node resides, the apparatus comprising:
circuitry configured to forward a message to a further plurality of nodes, included within said plurality of nodes, having a next lower rank, wherein, at each of said further plurality of nodes, said message is held, each of said plurality of nodes defining a channel access timer on the basis of a link quality metric, the channel access timer establishing a stand-off period during which the circuitry does not attempt channel access and listens to other nodes in the same rank as said node for successful forwarding of said message to parent nodes of said node by another communications node in the same rank on said channel,
wherein the circuitry discards said held message upon detection of the successful forwarding by another communications node in the same rank during said stand-off period and attempts to forward said held message upon expiration of said stand-off period.

5. The apparatus in accordance with claim 4, wherein the circuitry is further configured to select, from available nodes to which a message can be forwarded, a particular node, on the basis of a link quality metric.

6. The apparatus in accordance with claim 5, wherein said link quality metric includes a measure of signal to interference plus noise, SINR, in a communication channel defined between the apparatus and a node intended to be in receipt of said forwarded message, in use.

7. A network of communication apparatus in accordance with claim 4, each apparatus forming a node in the network, the network being in the form of a directed acyclic graph, DAG, having a plurality of ranks, at least one of said ranks having more than one node, wherein the circuitry in said apparatus in a rank having more than one node are each operable to concurrently attempt to forward a message on the basis of channel access governed by channel access timers, respective channel access timers for said co-ranked nodes being dependent on a link quality metric for forwarding of messages through said network from the node in question.

8. The network in accordance with claim 7, wherein, in each apparatus in a rank including more than one node, the circuitry monitors for successful forwarding of a message by another co-ranked node and, on detection of such forwarding, discarding said message in that apparatus.

9. A non-transitory computer-readable medium having computer-readable instructions thereon which when executed by a computer cause the computer to perform the method according to claim 1.

10. A communications apparatus for implementing a node in a network in the form of a directed acyclic graph, DAG, the network having a plurality of nodes arranged in a plurality of ranks in which said node resides, the apparatus comprising:
message forwarding means for forwarding a message to a further plurality of nodes, included within said plurality of nodes, having a next lower rank, wherein, at each of said further plurality of nodes, said message is held, each of said plurality of nodes defining a channel access timer on the basis of a link quality metric, the channel access timer establishing a stand-off period during which the message forwarding means does not attempt channel access and listens to other nodes in the same rank as said node for successful forwarding of said message to parent nodes of said node by another communications node in the same rank on said channel,
wherein the message forwarding means discards said held message upon detection of the successful forwarding from another communications node in the same rank during said stand-off period and attempts to forward said held message upon expiration of said stand-off period.

11. The method of claim 1, wherein at least one node periodically multicasts directed acyclic graph (DAG) Information Objects (DIO).

12. The method of claim 1, further comprising: storing information describing an outcome of forwarding; and updating stored information describing a route performance metric.

* * * * *